United States Patent
Backer

(10) Patent No.: US 7,917,757 B2
(45) Date of Patent: Mar. 29, 2011

(54) METHOD AND SYSTEM FOR AUTHENTICATION OF ELECTRONIC COMMUNICATIONS

(75) Inventor: Alejandro Backer, Altadena, CA (US)

(73) Assignees: California Institute of Technology, Pasadena, CA (US); Sandia Corporation, Albuquerque, NM (US)

( * ) Notice: Subject to any disclaimer, the term of this patent is extended or adjusted under 35 U.S.C. 154(b) by 1057 days.

(21) Appl. No.: 11/704,729

(22) Filed: Feb. 9, 2007

(65) Prior Publication Data

US 2007/0208941 A1    Sep. 6, 2007

Related U.S. Application Data

(60) Provisional application No. 60/772,063, filed on Feb. 9, 2006, provisional application No. 60/772,301, filed on Feb. 9, 2006.

(51) Int. Cl.
*H04L 9/32* (2006.01)
*H04K 1/00* (2006.01)
*H04L 9/00* (2006.01)
*H04L 9/30* (2006.01)

(52) U.S. Cl. .................. 713/170; 713/176; 380/30

(58) Field of Classification Search .......... 713/170, 713/176; 380/30
See application file for complete search history.

(56) References Cited

U.S. PATENT DOCUMENTS

| | | | |
|---|---|---|---|
| 6,327,656 B2 | 12/2001 | Zabetian | |
| 6,640,301 B1 | 10/2003 | Ng | |
| 7,444,380 B1 * | 10/2008 | Diamond | 709/206 |
| 2002/0046250 A1 | 4/2002 | Nassiri | |
| 2002/0059525 A1 | 5/2002 | Estes | |
| 2002/0186838 A1 * | 12/2002 | Brandys | 380/30 |
| 2003/0028767 A1 | 2/2003 | Bickford et al. | |
| 2003/0212791 A1 | 11/2003 | Pickup | |
| 2004/0024823 A1 | 2/2004 | Del Monte | |
| 2005/0198511 A1 * | 9/2005 | Tomkow | 713/176 |
| 2006/0143136 A1 * | 6/2006 | Low et al. | 705/64 |

OTHER PUBLICATIONS

S. Brin, L. Page: The Anatomy of a Large-Scale Hypertextual Web Search Engine. WWW7/Computer Networks 30(1-7): 107-117 (1998).
Page, Lawrence; Brin Sergey; Motwani, Rajeev; Winograd, Terry. The page Rank Citation Ranking: Bringing Order to the Web., (1999).

* cited by examiner

*Primary Examiner* — Shin-Hon Chen
(74) *Attorney, Agent, or Firm* — Steinfl & Bruno LLP

(57) ABSTRACT

A method and system to authenticate electronic communications, such as email. A trusted third party records information of each of sender's communications, such as date, time and recipients. Recipients are allowed to verify if their incoming messages match the data of their senders' outgoing communications. Mismatches can be used to filter out fake messages assuming stolen identities.

15 Claims, 4 Drawing Sheets

METHOD AND SYSTEM FOR AUTHENTICATION OF ELECTRONIC COMMUNICATIONS

RELATED APPLICATIONS

The present application claims the benefit of U.S. Provisional Application No. 60/772,063 filed on Feb. 9, 2006 and U.S. Provisional Application No. 60/772,301 filed on Feb. 9, 2006, the contents of both of which are incorporated by reference herein. The present application may be related to U.S. Ser. No. 11/704,730, filed on even date herewith, entitled "Reputation System for Web Pages and Online Entities", also incorporated by reference in the present application.

STATEMENT OF GOVERNMENT INTEREST

This invention was made in part with government support under a MICS Lab CFD, Grid and Other AMD grant awarded by the Office of Science of the DOE. The U.S. Government may have certain rights in the invention.

BACKGROUND

1. Field

The present disclosure relates to electronic communications. In particular, it relates to a method and system for authentication of electronic communications.

2. Related Art

Recently, emails from fake senders have multiplied immensely, causing problems of trustworthiness of electronic communications as well as cluttering inboxes around the world, costing valuable time to readers as well as consuming precious infrastructure resources, such as bandwidth.

Spam, or electronic communications unwanted by recipients, is a growing problem, to the point that many users receive more spam than desirable email. The problem is even driving pushes for new legislation. Because email travels along global communication networks, though, solutions at the national level are unlikely to succeed. Although anti-spam software exists, spammers are continually modifying the text of their messages, in an evolutionary race to beat anti-spam software. Inevitably, anti-spam software that relies on text filtering is one step behind spam.

Digital email signatures (see, e.g., U.S. Pub. App. 2002/0046250) are known. However, they serve the sender, not the recipient, of a message. U.S. Pub. App. 2003/0028767 discloses a method for enabling email recipients to authenticate an email sender without opening the email.

U.S. Pub. App. 2003/0212791 and U.S. Pub. App. 2004/0024823 disclose methods and systems for authorizing electronic mail, where information on the sender is compared with a list of authorized senders. U.S. Pub. App. 2002/0059525 discloses a method for authentication of email content. However, such method does not prevent unauthorized use of an email address as sender. Indeed, such method compounds the problem, making for the receipt of duplicate e-documents from fake as well as true senders.

Content verification methods are disclosed in U.S. Pat. No. 6,327,656 and U.S. Pat. No. 6,640,301. Those methods require the content of certified messages to be retained.

The Yahoo® email authentication system DomainKeys® allows for verification of the DNS domain of an email sender and the integrity of each email sent.

SUMMARY

The present disclosure addresses the problem of fake email sender addresses, which can fool recipients into delivering trusted information to an unintended recipient, or communicate false information, among other unwanted consequences. It also eliminates the widespread problem of bounced messages cluttering the mailbox of a sender that never sent them. It solves this problem by authenticating electronic messages such that only emails sent by the alleged sender are delivered to recipients.

According to a first embodiment, an authentication method for electronic mail is provided, comprising: providing a sender of electronic mail with an authenticating code; when the sender sends an electronic mail communication to a recipient, sending a message from the sender to a third party authentication entity; sending information about the electronic mail communication from the recipient to the third party authentication entity; comparing the message sent from the sender to the third party authentication entity with the information about the electronic mail communication from the recipient to the third party authentication entity; and in case result of the comparison authenticates the sender, delivering the electronic mail communication to the recipient.

According to a second embodiment, a method for authenticating electronic mail is disclosed, comprising: upon sending an electronic mail communication from a sender to a recipient and before delivering the electronic mail communication to the recipient, sending a challenge from the recipient to the sender, requesting the sender to authenticate the electronic mail communication; and upon authentication by the sender of the electronic mail communication, delivering the electronic mail communication to the recipient.

According to a third embodiment, a method for authenticating electronic mail is disclosed, comprising: sending an electronic mail communication from a sender to a recipient, the electronic mail communication being encrypted with a private key; posting a public key in a publicly accessible server, the public key including code signifying authenticity of the sender; comparing the private key with the public key; and delivering the electronic mail communication to the recipient if there is a match between the private key and the public key.

Additional embodiments of the present disclosure are present throughout the specification and claims of the present application.

In summary, a system to authenticate electronic communications, such as email, is provided. The system works by recording date, time and recipients of each sender's communications, either locally at the sender's machine or utilizing a trusted third party, or in a distributed way through a network, and allowing recipients to automatically verify that their incoming messages match the data of their sender's outgoing communications. Mismatches are used to filter out fake messages assuming stolen identities.

The method and system of the present disclosure are different from digital email signature systems, in that, differently from the prior art, they serve the recipient, not the sender, of a message. By virtue of the Certifier's making the certification software freely available, and because the certification can also be done manually, recipients can require certification of all messages before allowing messages into their inbox. This difference is critical, and provides an incentive for rapid adoption of the technology. In contrast, previous systems have been so unsuccessful that not even the leading provider of digital signatures itself, Verisign Inc., digitally signs its electronic communications. Furthermore, the system and method according to the present disclosure certify individual communications at particular dates, times and between particular senders and receivers, avoiding the pitfalls of digital signature thefts.

The system according to the present disclosure combines the best features of automated certification, requiring no action on the part of the users, with the advantages of a system available to all users regardless of technical expertise, previous experience or buying power.

Because the encryption occurs between sender and Certifier and between Certifier and recipient, the recipient does not need to have previous access to any information about the sender, such as a key, thus enabling reception of messages from unknown senders, in contrast to some previous methods (e.g. U.S. Pub. App. 2003/0028767). Unlike, for example, the methods in U.S. Pub. App. 2003/0212791 or U.S. Pub. App. 2004/0024823, the present disclosure does not require any list of authorized senders.

The present disclosure is also different from content verification methods (e.g., U.S. Pat. No. 6,327,656 or U.S. Pat. No. 6,640,301) because, among other things, it does not require the Certifier to retain the content of certified messages, a restriction that made previous methods impractical for inexpensive mass usage. The present disclosure only requires retention of date, time, and a relatively short unique identifying code, and furthermore does not require storage beyond the maximum delay in electronic communications.

The present disclosure also differs from DomainKeys® in that the sender's email address is verified as opposed to simply the DNS domain. This has important security applications (not every sender at an institution or domain will have the same authority or powers), spam (users may want to receive email from friends at Yahoo®, but not from spammers using Yahoo® accounts), etc.

A further advantage of the method and system of the present disclosure is that email messages are not sent to a third party, allowing the safeguarding of private information.

DETAILED DESCRIPTION

In the present disclosure, the words email, email message and electronic message are used to signify any kind of document transmitted through electronic or optical means. The "certifier", "third party", "authentication entity", or "authentication authority" is used to signify a third party to a sender S or a receiver R of a communication. The third party stores information about emails sent for the purpose of authentication.

Figure 1:
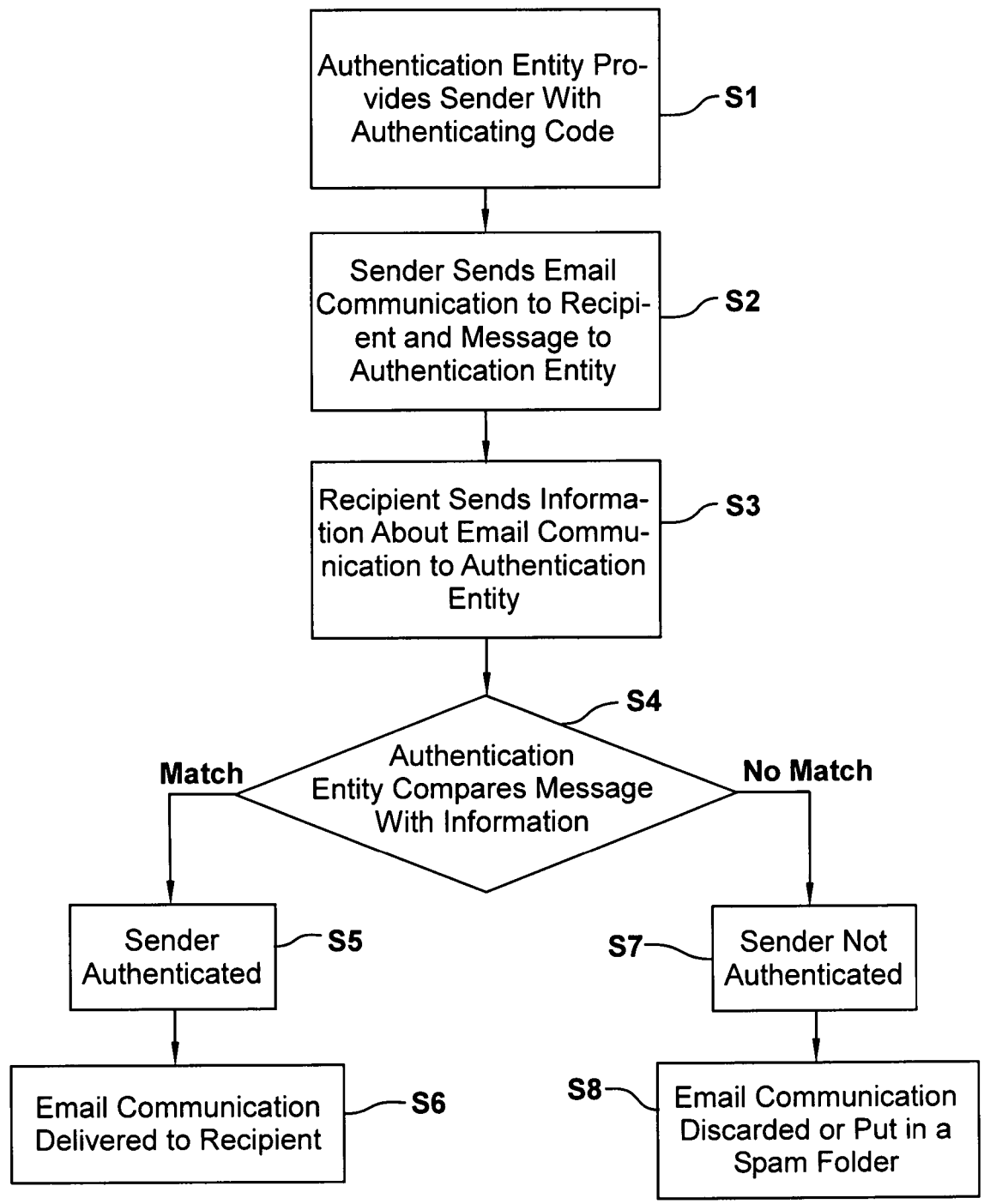
FIG. 1 shows a flow chart diagram in accordance with a first embodiment of the present disclosure.
Figure 2:
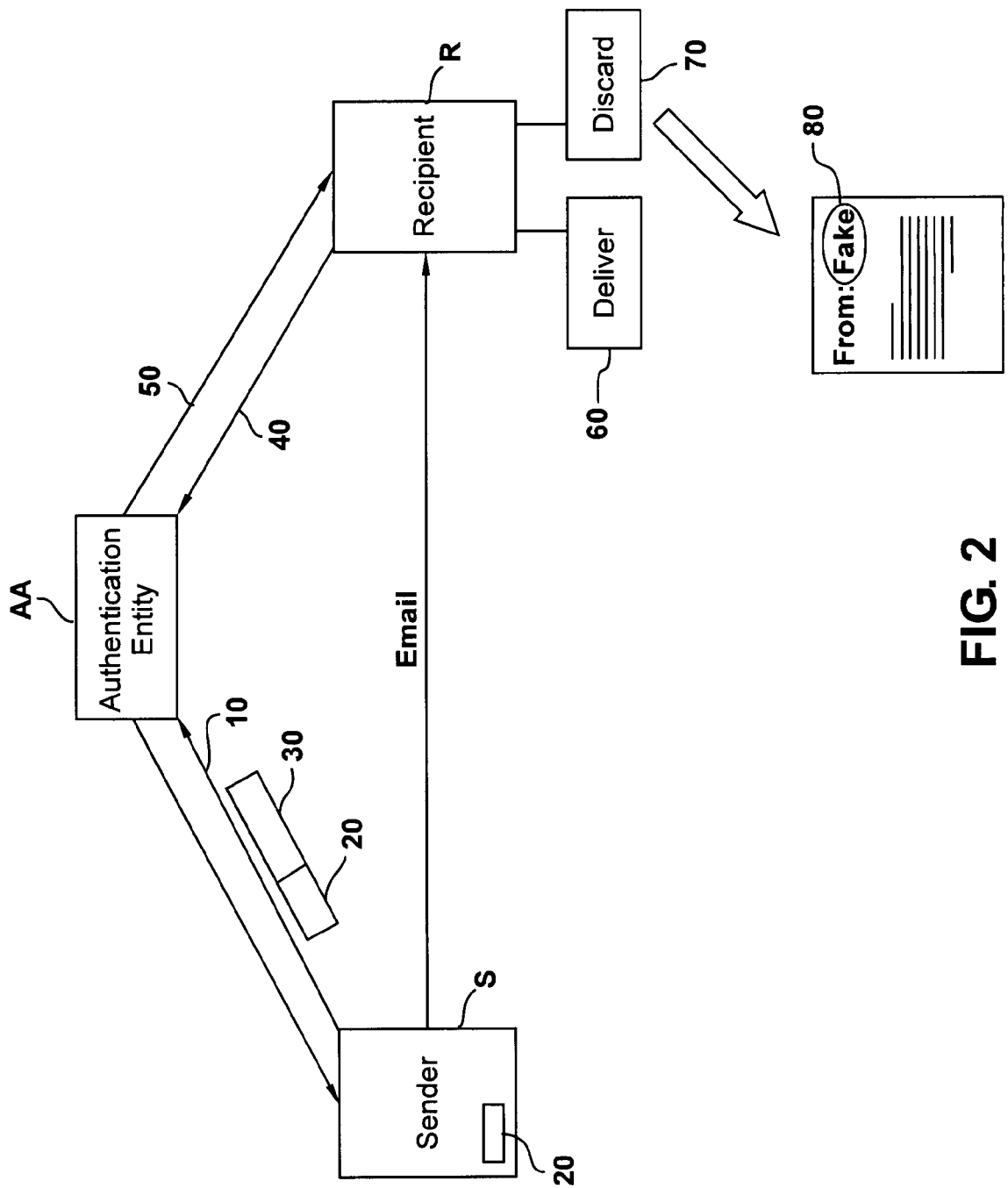
FIG. 2 shows a block diagram in accordance with the first embodiment.

According to an embodiment of the present disclosure, shown in FIGS. 1 and 2, the sender S gets a secret authenticating code once from an authentication entity or authority AA (e.g. a third party server), sent to the sender's email address, as shown by box S1 of FIG. 1. The sender's certification software then sends an email or other message M to the authentication authority (server) every time sender S sends an email communication E to recipient R. See step S2 in FIG. 1 and arrow 10 in FIG. 2. This email or message M contains the secret code 20 (FIG. 2) that identifies the sender S together with information 30 (FIG. 2) that identifies the email E (e.g. number of bytes, subject, recipient, date, time). The email or message M can be encrypted with standard encryption methods. The secret code 20 identifying sender S can be a password stored in the sender's computer or account in a standard manner, as shown in FIG. 2. The secret code can be encrypted to prevent access by spyware or malware. For the purposes of the present description, the combination of secret code 20 and email identifying information 30 will be called unique message identifier (UMI). The recipient R then sends to the third party authentication entity or authority AA (e.g., pings the third party authentication authority AA) information identifying the message E and receives confirmation or denial from AA that E was sent by sender S. See steps S3, S4 of FIG. 1 and arrows 40, 50 in FIG. 2. The recipient R only accepts delivery of messages authenticated by authentication authority AA. The pinging operation recipient R→authentication authority AA is performed by way of verification software embedded in the recipient's email application. The information sent by the recipient R to the authentication authority AA is checked against a database in the authentication authority AA. In other words, was a message with UMI sent to recipient R by sender S as evidenced by the records of AA?

If the UMIs, senders and recipients match, the message is delivered to the recipient's inbox. See steps S5, S6 of FIG. 1 and box 60 of FIG. 2. If not, the message is put in a Spam folder, or discarded, depending on the recipient's pre-selected option. See steps S7, S8 of FIG. 2 and box 70 of FIG. 2. If the sender S is not registered with the certifier AA, the sender S receives an electronic message allowing him/her to confirm the authenticity of the message manually. For example, the sender can receive a message requesting him to reply to it or to click a button/link saying "YES, this is a legitimate email." If desired, this step can include a process to verify the sender as a human, such as a challenge-response test (commonly known as 'captcha') requesting the sender to type characters he/she sees on his/her screen. The sender S will also be invited to download a copy of the certification software, to avoid the need for future manual verifications. If the authenticity is confirmed, the message will be delivered to the inbox of recipient R.

According to an aspect of the present disclosure, authentication must arrive within a pre-specified period of time from the time of original mailing.

According to another aspect of the present disclosure, unauthenticated email can be filtered by providing a first kind of tag for authenticated email and a second kind of tag for unauthenticated email (or just a single tag for unauthenticated emails), the tag being, for example, provided on the header line, subject line, or into the body of the message itself, and then providing a filtering application (running on the email client or the email server) to remove emails with unauthorized tags. See, for example, tag 80 shown in FIG. 2. This embodiment facilitates integration with existing email applications which allow for rules to filter messages based on email contents.

According to a further aspect already discussed above, registration with the third party authentication authority AA (Certifier) provides the submission of information that is included in an email message to the sender seeking registration (registrant), ensuring that only registrants with access to an email address can certify emails that appear to come from that email address.

According to yet another aspect, the Certifier's records or emails sent out can be used to verify whether bounced emails were indeed sent by the legitimate owner of the email address claimed to originate them before bouncing them back to the alleged sender, for the purpose of eliminating illegitimate bounced emails, avoiding one source of clutter in today's email inboxes caused by several mass mailing worms. This can be done by comparing the incoming bounced message with a record of sent messages, and only delivering a bounced message to the inbox if there is a match.

In some embodiments, the message from sender to the authentication authority can take place after the recipient has requested such authentication from the sender. In general, though, greater efficiency can be accomplished by not requiring that the receiver asks the sender for authentication.

Figure 3:
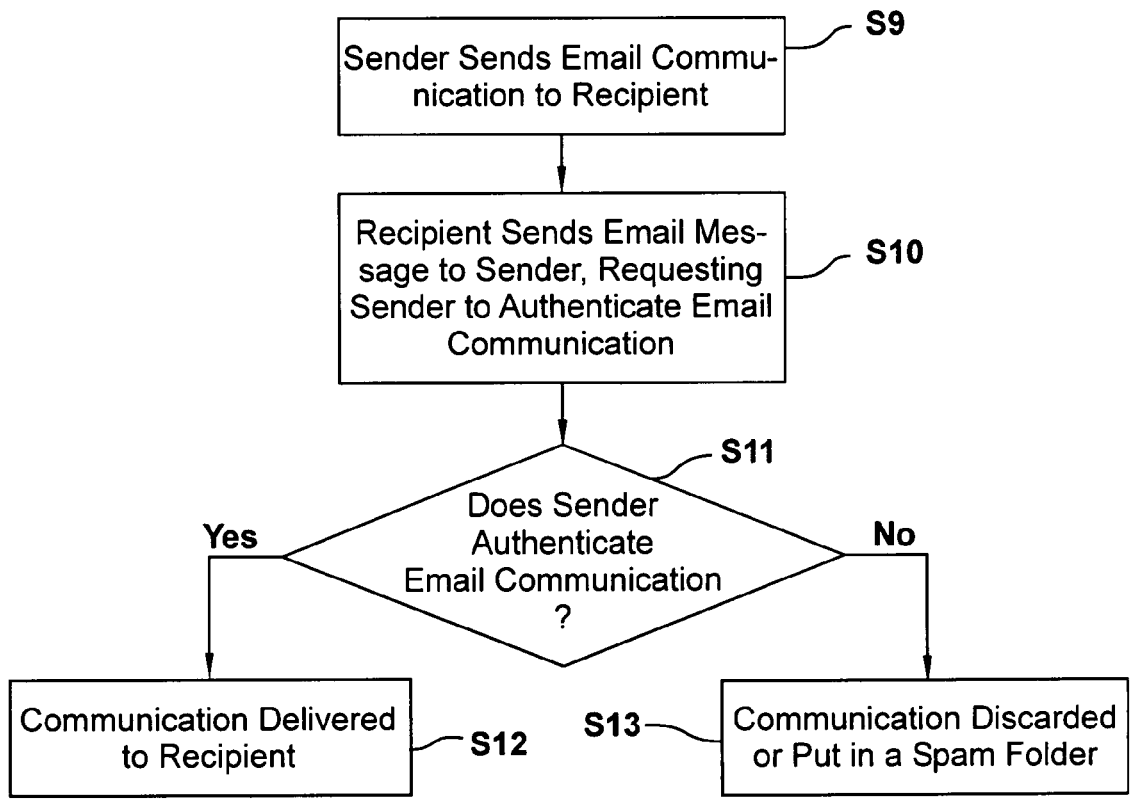
FIG. 3 shows a flow chart diagram in accordance with a second embodiment of the present disclosure.

According to another embodiment of the present disclosure, also shown in FIG. 3, the receiver's software or hardware replies to each incoming email asking the sender to authenticate that they sent the message (e.g. "Did you send a message with X bytes, subject S to recipient R on date D and time T?"). See steps S9, S10 in FIG. 3. The sender's software replies authenticating any email that it did send, step S11, usually without manual intervention. If the sender does not have such authenticating software (which maintains records of emails sent, intercepts authentication emails and responds to them appropriately), the sender can authenticate the email by responding manually to the authentication challenge. The receiver will only accept authenticated messages, as shown in step S12. The present embodiment and the authentication authority embodiment serve the same purpose. They both have the sender keep track of what it sent, and have the receiver verify that before accepting a message. Note that authentication is not a one-time process, which could lead to a white-listed email address being hi-jacked by others, but rather an ongoing process that recurs with each communication sent by the sender.

In some embodiments, authentication can be accompanied by information identifying the sender (such as IP address) so that future communications coming from the same IP address, for example, are accepted even in the absence of re-authentication. These embodiments, however, are liable to faking of IP addresses; therefore, re-authentication with each email address is preferable.

In some embodiments, the process of authentication challenge and response is carried out not by emails, but rather by electronic communications operating on other ports. In some embodiments, the recipient challenges the sender by requesting that the sender post a message to a particular IP address, and the sender responds by posting a message corresponding to authentication or denial to the requested IP address. In some embodiments, this is done by the recipient sending a randomly selected URL at a trusted third party to the sender, the sender accessing such URL, the URL recording that it has been visited by the sender, and the recipient confirming such visit.

Figure 4:
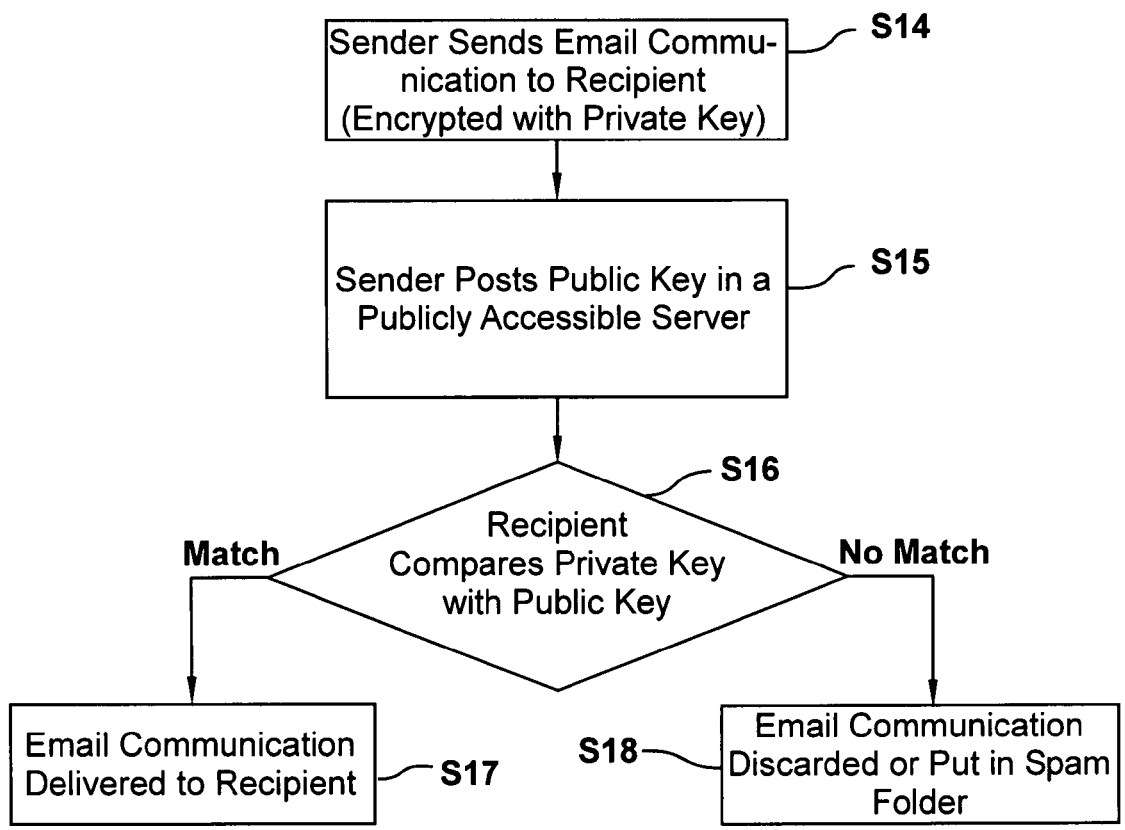
FIG. 4 shows a flow chart diagram in accordance with a third embodiment of the present disclosure.

According to yet another embodiment of the present disclosure, also shown in FIG. 4, the sender S encrypts messages with a private key (S14), posts a public key in a publicly accessible server (S15) and includes a code to the effect of "AUTHENTIC". This posting is performed once at the beginning. Each sender will have a unique code or set of codes that identifies a message sent by that sender as authentic. The public key allows a recipient to process a message that claims to be from a sender to decrypt it and conclude whether it is authentic or not by looking for a given string, e.g. "AUTHENTIC." If the sender is "spoofed" (i.e. if the email appears to be sent by the sender but actually it is not), public and private keys will not coincide or match, and the message will be garbled and unreadable (S18). The recipient R will only allow messages that include "AUTHENTIC" code into the inbox (S17). The private key is kept secret by the sender, and used to encode the message (e.g. encode "AUTHENTIC"). The public key is used to decode the message. The sender field is not encoded, as this is needed to lookup the public key in a database of public keys or in a server associated with the sender. The present embodiment and the authentication authority embodiment serve the same purpose. The latter uses a secret code known only to the sender to authenticate messages in a way that any recipient can check.

According to a further embodiment, a plug-in is provided for email clients. The person skilled in the art will understand that a plug-in is a computer program that interacts with an application (in this case the email client) to provide a certain function. Upon receipt of each email, the plug-in pings the alleged sender's server with a code uniquely identifying the email received. For example, the code can comprise some aspect of the text plus the recipient plus date and time. The server—if provided with authentication software—checks the code from the ping with a database of sent emails and returns a YES/NO answer. The email client plugin then displays "AUTHENTICATED BY SERVER X" if it received a YES, and does not show the message at all, or displays "SPOOF" or a similar message if it receives no answer from the server (for example, if the sender does not have authentication software).

A spoofer Y could authenticate its messages, but they would say AUTHENTICATED BY SERVER Y rather than BY SERVER X, so the user would know that the email did not come from X, and the email client could disallow authentication by servers that do not correspond with the domain of the server altogether. The same could be implemented by the receiving server instead of the client. For example, an email coming from JohnDoe@ibm.com would trigger an authentication request to authentication.ibm.com.

Further embodiments of the present disclosure are also possible, where the teachings of the present disclosure are combined with the teachings of U.S. Ser. No. 11/704,730, filed on even date herewith, entitled "Reputation System for Web Pages and Online Entities", incorporated by reference in the present application.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

The invention claimed is:

1. An authentication method for electronic mail, comprising:
   providing a sender of electronic mail with an authenticating code;
   when the sender sends an electronic mail communication to a recipient, sending a message from the sender to a third party authentication entity;
   sending information about the electronic mail communication from the recipient to the third party authentication entity;
   comparing the message sent from the sender to the third party authentication entity with the information about the electronic mail communication from the recipient to the third party authentication entity; and
   in case result of the comparison authenticates the sender, delivering the electronic mail communication to the recipient.

2. The method of claim 1, wherein the authenticating code is provided to the sender by the third party authentication entity.

3. The method of claim 1, wherein the authenticating code is provided to the sender by being sent to the electronic mail address of the sender.

4. The method of claim 1, wherein the message sent from the sender to the third party authentication entity is an electronic mail message.

5. The method of claim 1, wherein the message sent from the sender to the third party authentication entity is an encrypted message.

6. The method of claim 1, wherein the message sent from the sender to the third party authentication entity contains a code indentifying the sender together with information identifying the electronic mail communication.

7. The method of claim 6, wherein the information identifying the electronic mail communication comprises: number of bytes, subject, the recipient, date and time of the electronic mail communication.

8. The method of claim 6, wherein the code identifying the sender is a password stored in a sender's computer or account.

9. The method of claim 1 wherein, in case the result of the comparison does not authenticate the sender, the recipient has an option of discarding the electronic mail communication or putting the electronic mail communication in a spam folder.

10. The method of claim 1, wherein electronic mail communication from an unauthenticated sender is evidenced by an unauthentication tag to allow removal of the communication by way of recipient's filtering software.

11. The method of claim 10, wherein the unauthentication tag is added to a header line, subject line, or body of the electronic mail communication.

12. The method of claim 1, wherein the providing the sender of electronic mail with the authenticating code comprises:
the authentication entity sending an electronic message to the sender to allow the sender to manually confirm authenticity of the electronic mail communication to the authentication entity.

13. The method of claim 12, wherein the providing the sender of electronic mail with the authenticating code further comprises:
inviting the sender to download certification software to avoid further manual confirmations.

14. The method of claim 1, wherein delivering the electronic mail communication to the recipient is subject to an additional condition of authentication of the sender arriving to the recipient within a preset period of time from the original mailing time.

15. The method of claim 1, wherein records of the third party authenticating entity or third party electronic mail communications sent by the third party authenticating entity are verifiable to verify whether bounced electronic mail communications were indeed sent by a legitimate owner of an electronic mail address.

* * * * *